CLOCK POWER DISTRIBUTION ARRANGEMENT FOR HIGH SPEED LOGIC SYSTEMS

Filed Feb. 13, 1963

INVENTORS:
WILLIAM PEIL,
HEINZ RAILLARD,
BY Marvin A. Goldenberg
THEIR ATTORNEY.

United States Patent Office 3,267,394
Patented August 16, 1966

3,267,394

CLOCK POWER DISTRIBUTION ARRANGEMENT FOR HIGH SPEED LOGIC SYSTEMS

William Peil, Syracuse, and Heinz Raillard, Liverpool, N.Y., assignors to General Electric Company, a corporation of New York Filed Feb. 13, 1963, Ser. No. 258,295
8 Claims. (Cl. 333—8)

The present invention relates to clock power distribution arrangements for very high and ultrahigh frequency systems. More specifically, this invention relates to clock, or pump, power distribution arrangements for high speed logic systems such as embodied in high speed electronic computer equipments. As herein used high speed is intended to signify operation in the very high frequency range and above.

Considerable interest has been generated recently in the field of high speed electronic computers. Although the need for such ultra fast computers has existed for many years, it is more acute today than ever before. The real time computations required for space travel, weather prediction and scientific analysis absolutely demand the existence of these high speed machines. In addition, in areas where present day computer performance is adequate, high speed techniques can be employed to greatly reduce circuit complexity and thus gain the advantages of lower cost and improved reliability.

In general, logic systems comprise a plurality of compatible interconnected logical elements in which output pulses are generated in response to one or more applied input signals, which outputs are coupled to other elements of the system in a manner such as to perform a desired logic function or functions. Generally, clock or pump signals are also applied to said logical elements for providing a reference for the logical sequences that take place, and which are employed, e.g., for such purposes as synchronous read-in, read-out and information transfer. The term pump is normally used in lieu of clock wherein gain is obtained in the logical elements. It is desirable for reasons of simplicity and economy to provide the clock signals to the various logical elements from a single source, or a minimum number of sources. For proper operation of the system it is imperative that the clock signals be applied in synchronism to each of the logical elements. When considering high speed logic systems in which the wavelength of the R.F. energy is on the order of the dimensions of the transmission lines supporting said energy, because of the inherent limitation of the speed of light clock signals from a single source tend to appear with different phase at different portions of the system. This destroys synchronism and, in any appreciable degree, cannot be tolerated. Hence, in the prior art numerous compensating techniques have been attempted none of which have been found to be completely satisfactory.

It is accordingly an object of the present invention to provide a novel clock power distribution arrangement which supplies from a single clock source a plurality of high frequency clock signals in phase synchronism.

It is a further object of the present invention to provide a novel clock power distribution arrangement which supplies from a single clock source a plurality of high frequency clock signals in phase synchronism and of equal amplitude.

It is another object of the present invention to provide a novel clock power distribution arrangement providing the above noted functions which is of a ready and inexpensive fabrication.

It is a further more particular object of the present invention to provide a novel clock power distribution arrangement for use with high speed logic systems which supplies clock signals in phase synchronism and of equal amplitude to a plurality of logical elements.

Briefly, these and other objects of the invention are accomplished by providing a transmission line to which is applied the clock source. The transmission line is terminated to have an electrical length that is approximately an integral number of quarter wavelengths of the clock frequency so as to provide substantial energy reflection and thereby generate a standing wave on said line. A plurality of taps is taken from the segment of the transmission line in which is developed the peak portion of the standing wave, said portion existing about the peak voltage point. Said taps are connected to respective locations where clock signals of synchronous phase are required. With respect to logic systems, these locations are at each of the logical elements.

In accordance with a further aspect of the invention high impedance compensating elements are connected between said taps and said respective locations which elements are employed to compensate for the amplitude differential of the standing wave pattern and thereby provide clock signals to each of said locations that are of essentially equal amplitude. In addition, the compensating elements may be employed to adjust the phase synchronism of the clock signals that are applied to said locations.

While the specification concludes with claims particularly pointing out and distinctly claiming the subject matter which is regarded as the invention, it is believed that the invention will be better understood from the following description taken in connection with the accompanying drawings in which:

Figure 1:
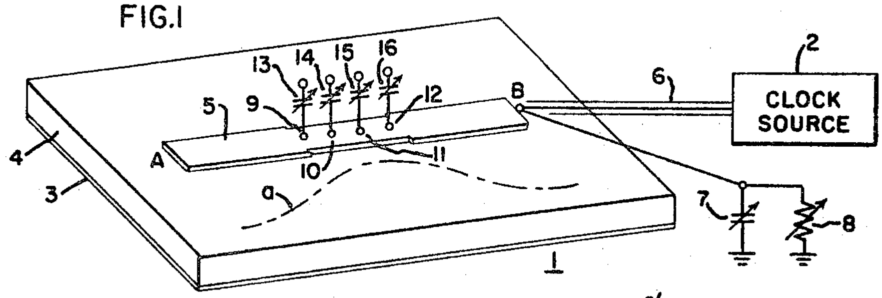
FIGURE 1 is a perspective view of one embodiment of a strip transmission line having open circuited ends in accordance with the invention for distributing synchronous clock signals to a plurality of locations.

Referring now to FIGURE 1, there is illustrated a perspective view of a strip transmission line 1 to which clock signals from a clock source 2 are applied for providing distribution of said signals in a phase synchronous relationship to a plurality of locations. By phase synchronous, it is intended to mean locked together with the same phase or with a determinable phase difference and being independent of said special considerations. The strip line 1 includes a ground plate 3, such as copper, overlaid with a layer 4 of suitable dielectric material, such as glass or an epoxy resin, and with a conducting strip 5 overlaying the dielectric layer. The strip line 1 is open-circuited at end A and, in general, has an electrical length which is approximately an integral multiple of half wavelengths of the applied clock signals. Typically, the dimension of the line may be considered to be approximately one full wavelength, as shown in FIGURE 1.

The clock source 2 is coupled through a coaxial cable 6 to end B of the line. The line is resonant and characterized by essentially a total reflection of energy at both ends to provide a standing wave pattern, as indicated by the broken line curve "*a*." The standing wave has voltage antinodes and current nodes at the ends and at the center. It is convenient to couple into the line 1 from the clock source 2 at a point near the voltage antinode, such as at the end of the line as shown in FIGURE 1, to simplify input impedance matching to the line. The line is normally slightly less than an integral number of half wavelengths, this making the line appear slightly reactive so that it may be readily tuned to resonance by a lumped shunt reactance. Typically, the line is made inductive and a variable capacitor 7 is coupled across the input to the line. In shunt with capacitor 7 is a variable resistor 8 which provides an impedance match between the coaxial cable 6 and the line.

A series of spaced output taps 9, 10, 11 and 12 are provided at a segment of the line supporting the peak voltage portion of the standing wave. For example, these taps may be provided in the region one-eighth wavelength to either side of the peak point of the standing wave. Although for convenience of illustration, four output taps are shown, it may be appreciated that more or less may be employed as required. Each of the taps is connected through a preferably non-dissipative compensating impedance, illustrated as variable capacitors 13, 14, 15 and 16, the reactance of each being adjusted to provide output clock signals having equal amplitude. The output taps are taken from a segment of the line around the peak voltage so that compensation is readily achieved. The conducting strip is notched to have a narrower width at the tapped segment for the purpose of maintaining constant the capacitance per unit length of the tapped line. A stable standing wave pattern is provided by an essentially total reflection of energy at the ends of the strip line 1. In addition, both the real and reactive loading components of the compensating elements 13 to 16 are slight so as not to appreciably disturb the standing wave pattern. Typically, the real loading is 5% or less of the supplied power. In an exemplary operation, twenty-eight compensating capacitors of .5$\mu\mu$f. each were employed. Each capacitor drew one-half a milliwatt of power for a supplied clock power of approximately two-thirds of a watt.

The clock signals from the output taps 9 to 12 may be applied to various locations requiring phase locked or phase synchronous signals of equal amplitude. A typical application would be with respect to a high speed logic system such as described in a copending application entitled "D.C. Power Distribution Arrangements for High Frequency Applications," Serial No. 258,240, filed February 13, 1963 by Y. C. Hwang and W. Peil and assigned to the assignee of the present invention.

Figure 2:
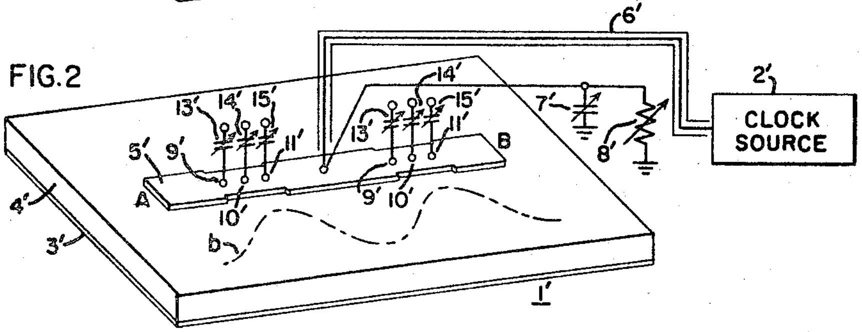
FIGURE 2 is a perspective view of a second embodiment of a strip transmission line having open-circuited ends in accordance with the invention.

It may be appreciated that the clock distribution line may be of any desired wavelength and that the clock source may be coupled to any point on the line corresponding to approximately a voltage antinode in accordance with the foregoing teaching. Accordingly, in FIGURE 2 there is shown a second embodiment of a clock distribution line 1', the ends of which are open-circuited, wherein the clock source 2' is coupled to an intermediate point on the line at a voltage peak. The components of FIGURE 2 that are similar to those of FIGURE 1 are identified by similar reference characters, but with an added prime notation. The dimension from the tap in point to either end A and B of the line 1' is approximately one wavelength, as shown by the broken line curve "*b*." As before, a variable capacitor 7' and resistor 8' are employed for tuning the line to resonance and providing an impedance match to the line. Spaced output taps 9', 10' and 11' coupled, respectively, through compensating variable capacitors 13', 14' and 15' supply clock signals of equal phase and equal amplitude from the peak portions of the line to a plurality of locations.

Figure 3:
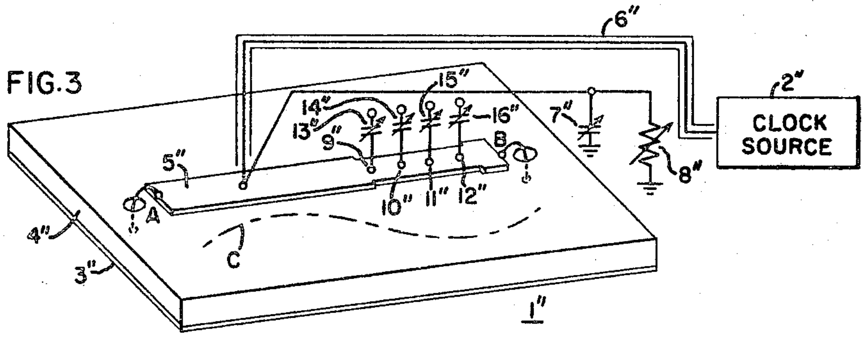
FIGURE 3 is a perspective view of a third embodiment of a strip transmission line having closed-circuited ends in accordance with the invention.

In FIGURE 3 is shown a third embodiment of the invention in which the ends A and B are short-circuited to the ground plate 3'' and have voltage nodes and current antinodes thereat. The components of the line shown in FIGURE 3 which are similar to those of FIGURE 1 are identified by similar reference characters, but with an added double prime notation. The clock source 2'' is coupled to intermediate point of the conducting strip 5'', which intermediate point corresponds to a voltage antinode. The intermediate point is illustrated as one-quarter wavelength from end A of the strip 1'' but it may be recognized that its location can be at any point an integral number of half wavelengths from the point indicated. The clock distribution arrangement shown is otherwise as described with respect to FIGURES 1 and 2 and will not be further treated.

Figure 4:
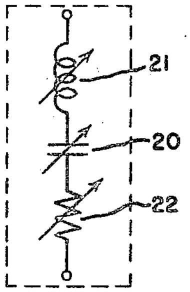
FIGURE 4 is a schematic diagram of an alternate compensating impedance arrangement that may be employed with the transmission lines of FIGURES 1, 2 and 3.

In FIGURE 4 is illustrated an alternative compensating impedance that may be employed for the elements 13 to 16 for controlling the phase relationship between output clock signals. The impedance may include the series connection of a variable capacitor 20, variable inductor 21 and variable resistor 22. By employing such compensating impedance the relative phase of the clock signals taken from the output taps of the distribution line can be readily adjusted over a range of 0° to 360°.

The invention has been described with respect to a few exemplary embodiments for the purposes of clear and adequate disclosure. However, the invention is not intended to be thus limited and it is recognized that numerous modifications thereof may readily occur to those skilled in the art. For example, reactive terminations may be used to provide the electrical equivalent of the open and short-circuited terminations. In addition, distribution lines may be employed which are electrically open at one end and closed at another.

Although the illustrated strip lines have been described with respect to one or two branches, it may be recognized that more than two branches can also be employed which have a common tap in point and which branches are of the proper electrical length. Further, other types of transmission media than strip lines may also be employed. For example, at the higher frequencies waveguides can be used, the operation of which is analogous to that set forth with respect to strip lines.

The appended claims are intended to include all modifications falling within the true scope of the invention.

What we claim as new and desire to secure by Letters Patent of the United States is:

1. A distribution system for supplying a plurality of high frequency electrical signals in phase synchronism comprising:

(a) a transmission line having an electrical length on the order of an integral multiple of quarter wavelengths of said electrical signals and non-dissipatively terminated so as to provide substantially complete energy reflection at said high frequency, thereby generating a standing wave pattern along said line, (b) means for coupling a source of energy at said high frequency to said line for generating said standing wave pattern, and (c) a plurality of output means coupled along the length of said line for deriving from the standing wave pattern said phase synchronous electrical signals, said output means only slightly loading down the line and thus not appreciably disturbing said standing wave pattern.

2. A distribution system as in claim 1 wherein said output means include variable impedance elements for adjusting the amplitude and phase of the electrical signals.

3. A distribution system as in claim 1 wherein said transmission line is a strip line electrically open-circuited at least at one end thereof.

4. A distribution system as in claim 1 wherein said transmission line is a strip line electrically short-circuited at least at one end thereof.

5. A distribution system for supplying a plurality of high frequency electrical signals in phase synchronism comprising:

(a) a transmission line having an electrical length equal to substantially an integral multiple of quarter wavelengths of said electrical signals, said line being terminated so as to provide at the ends thereof essentially total energy reflection, (b) means for coupling a source of energy at the frequency of said electrical signals to said line, thereby generating a standing wave pattern along said line, said source being coupled to a point on said line slightly offset from a voltage antinode of said standing wave patterns so that the line input impedance appears somewhat inductive, (c) said coupling means including a variable shunt capacitor for tuning the line to resonance, and (d) a plurality of spaced output means coupled along the length of a segment of the line for providing said electrical signals, said segment being disposed about a voltage antinode, said output means only slightly loading down said line so as not to appreciably disturb said standing wave pattern.

6. A distribution system as in claim 5 wherein said spaced output means each include a variable capacitance for equalizing the amplitude of said electrical signals.

7. A distribution system as in claim 6 wherein said transmission line is a strip line open-circuited at one end thereof and having an electrical length equal to an integral number of half wavelengths of said clock signals, said source being coupled to the other end of said line.

8. A distribution system as in claim 6 wherein said transmission line is a strip line open-circuited at least at one end thereof and having an electrical length equal to at least one wavelength of said clock signals, said source being coupled to an intermediate point along said line.

References Cited by the Examiner

UNITED STATES PATENTS

| | | | |
|---|---|---|---|
| 2,794,185 | 5/1957 | Sichak. | |
| 2,820,206 | 1/1958 | Arditi | 333—84 |
| 2,914,737 | 11/1959 | Tongue | 333—8 |
| 2,946,024 | 7/1960 | Mills | 333—84 |
| 2,976,498 | 3/1961 | Locus | 333—84 |
| 3,005,986 | 10/1961 | Reed | 333—84 |

HERMAN KARL SAALBACH, *Primary Examiner.*

W. K. TAYLOR, P. L. GENSLER, *Assistant Examiners.*